FREQUENCY-SHIFT TELETYPEWRITER

Filed Aug. 22, 1966

5 Sheets-Sheet 1

ROBERT H. WEITBRECHT
INVENTOR.

BY [signature]
ATTORNEY

ROBERT H. WEITBRECHT
INVENTOR.

BY Reed C. Lawlor
ATTORNEY

ROBERT H. WEITBRECHT
INVENTOR.

BY Reed C. Lawlor
ATTORNEY

ROBERT H. WEITBRECHT
INVENTOR.

BY [signature]
ATTORNEY

ROBERT H. WEITBRECHT
INVENTOR.

BY Reed C. Lawlor
ATTORNEY 3,507,997
FREQUENCY-SHIFT TELETYPEWRITER
Robert H. Weitbrecht, 1966 Woodside Road, Redwood City, Calif. 94061
Filed Aug. 22, 1966, Ser. No. 574,217
Int. Cl. H04l 5/08
U.S. Cl. 178—66 13 Claims

ABSTRACT OF THE DISCLOSURE

A transmitter and receiver are disclosed for a teletypewriter. The frequency-shift receiver responds to mark-frequency signals above a predetermined threshold to reduce the gain of the receiver during mark intervals, so that the receiver will not respond to spurious space-frequency signals, e.g., echoes. This is accomplished by a limiter amplifier in conjunction with a filter tuned to the space-frequency.

This invention relates to an improved telegraph system and more particularly to one system to aid deaf people and mute people and other persons having speech or hearing deficiencies to communicate by means of teletypewriters and teleprinters over ordinary telephone circuits.

In this invention, an improved telegraph unit including both a transmitter and a receiver is provided which may be easily and readily coupled to a telephone system without requiring modification of the telephone system itself. In using this invention, such a unit is coupled to a telephone system at each station which is to be connected for transmission to and reception from another station.

This invention makes use of many of the principles commonly employed in printing telegraph systems. As in other telegraph systems, characters are transmitted as patterns of pulses. In analogy with telegraph systems employing Morse codes, certain pulses are called mark pulses while other pulses are called space pulses. In one such code, a character pattern consists of seven pulses. Normally, the first, or start, pulse of each character pattern is a space pulse and the last, or stop, pulse is a mark pulse. Such pulses are generated at a transmitter by means of a keying unit which operates to produce a signal of marking level, say 10 volts, during a mark interval and a signal of space level, say zero volts, during a space interval. It also employs a relay at the receiving end which normally is in mark condition when current flows in it, but is transferred to a space condition when no current flows in it. Accurate transmission of signals requires that a mark current such as 30 ma. be applied to a relay at the receiver each time a mark signal is generated at the keying unit, and that a space current such as 0 ma. be applied to the relay at the receiver each time a space signal is supplied by the keying unit at the transmitter. The invention is described with reference to a 5-unit teletypewriter code, commonly called the Baudot code, in which each character to be transmitted is of uniform length. Each character, whether it be letter, numeral, punctuation mark, or other character, is composed of a combination of five information pulses each of which may be either a space pulse or a mark pulse, which are transmitted during five intervals of equal length preceded by a start (space) pulse of that length and followed by a stop (mark) pulse of slightly greater duration. Thus, each character signal comprises seven pulses: a start pulse, five intervening information-bearing pulses, and a stop pulse. The seven pulses occur in a total interval called an operating cycle. The first six pulses in each operating cycle typically have intervals of 22 ms. (milliseconds) while the seventh or stop pulse typically has a duration of 31 ms.

The mark and space pulses are carried over the telephone system in the form of voice-frequency on-off keyed tone bursts. That is, a tone of a certain frequency is keyed on during space intervals and is keyed off during mark intervals. The receiver at each station thus receives this tone and correspondingly keys the relay concerned. However, when an attempt is made to convey an accurate telegraph code signal over a telephone line, echoes of the transmitted signal and other spurious effects such as random noise and cross-talk originating from disturbances along the line can interfere with the accurate reproduction of said code signal. In this invention advantage is taken of the fact that the amplitude of the mark and space signals that are to be detected is usually much greater than the amplitude of echoes and other spurious signals.

One of the objects of the invention is to provide a system for improving the reliability of transmission of intermittently occurring mark and space pulses.

Another principal object of this invention is to provide a system for increasing the accuracy of transmision of information by means of a teletypewriter code over a telephone line.

Another object of the invention is to provide an improved system for coupling a teletypewriting system to a telephone line.

Another object of the invention is to provide a coupler for coupling a teletypewriter system to a telephone system without rendering the telephone system inoperative for ordinary use.

In the best form of the invention, use is made of a telephone system in which the speaker element and the hearing element at each station form parts of a handset of a type that is in common use. In such a handset, the speaker element and the hearing element are mounted a fixed distance apart on a support body. The speaker element of the handset is of a type which ordinarily picks up sounds, usually voice sounds, and converts them into electrical signals for transmission over a telephone line and the receiving element is in the form of an electromechanical transducer or receiver which receives such electrical signals and converts them into sound signals.

In the ordinary operation of a telephone system, the original sound signals are usually provided by a voice of a person using the telephone, but in this invention the transmitted sounds are in the form of bursts of constant frequency signals. Two principal types of such signals are used in this invention. One is a space signal of one frequency that is transmitted in sequences of bursts corresponding to a telegraph code. The other is a signal of another frequency that is employed to suppress the effects of echoes of the bursts of space signals and to suppress other noise so that the trains of signals reproduced at the receiver will accurately represent trains of transmitted signals. This other signal is usually termed an echo-squelch signal herein, and sometimes a mark signal.

In this invention, a telegraph system is provided which includes at each station accessory equipment in the form of a teletypewriter, a transmitter unit, a receiver unit, and a telephone coupler for facilitating accurate transmission of the telegraph signals between stations over a telephone line. The telephone coupler includes a transmitting coupler in the form of a miniature loudspeaker which produces sounds generated by the transmitter unit in response to operation of the sending portion of the teleprinter to transmit coded signals over the line. The telephone coupler also includes a receiving coupler in the form of a pick-up unit for detecting signals that are transmitted over the line and which then feeds into the receiver unit so as to cause the receiving portion of the teleprinter to respond to such transmitted signals as to accurately reproduce the transmitted message. By employing such a system at two stations at the respective ends of a telephone line, communication is facilitated between two deaf, or mute, people located at the two stations without, however, so modifying the telephone system that it cannot be readily used by other persons simply by picking up the handsets and using the telephone system in the ordinary way.

In the best mode of practicing the invention, the transmission coupler is in the form of a loudspeaker and the receiving coupler is in the form of a magnetic coil which is inductively coupled to the magnet which ordinarily forms part of the telephone receiver.

With this invention, duplicate units are installed at two stations between which communication is to be established and signals may be transmitted in either of two directions, either from a first station to a second station or in the reverse direction. For convenience in referring to events occurring at the two stations, the term "local" is applied to one station from which signals are being transmitted and the term "remote" is applied to the other station, that is the station at which the signals are being received. The invention may be understood by the reader by considering that he is located at the "local" station and is communicating with another person at the "remote" station. In keeping with this identification, parts, messages, and the like occurring at the local station are referred to as "local," and parts, messages, and events occurring at the "remote" station are referred to as "remote."

In such systems, it is desirable to provide an arrangement for making a local copy to enable the person who is transmitting a message to actually see the message as it is being transmitted over the telephone line. In this invention, the transmitting coupler is lightly coupled to the receiving coupler at each station in order to produce signals in the local receiver unit which corresponds to those being transmitted from the local transmitter unit to the remote receiver unit. In this way, the local teletypewriter is actuated by the transmitted signals, thus producing a local message representing that actually being supplied to the telephone line by the transmitter unit.

In this invention, the DC space and mark signals generated by a keying unit are employed to generate audio frequency space and mark signals of different frequencies respectively and these audio frequency signals are transmitted over a telephone line to a remote station where they are rectified in order to reconstruct the original DC space and mark signals. The DC signals are in the form of square waves or pulses. In this invention, audio frequency signals of a first predetermined frequency such as 1800 c.p.s. are transmitted during space intervals from a local station to a remote station and signals of a second predetermined frequency such as 1400 c.p.s. are transmitted from the local station to the remote station during at least part of the mark intervals and the signals of the second frequency are employed to render the receiver at the remote station insensitive to spurious 1800 c.p.s. signals arriving there during mark intervals. In a similar manner the receiver at the local station is rendered insensitive to spurious signals that may be received at the local station from the telephone line during mark intervals. Both frequencies lie within the transmission band of a telephone system, which band generally extends up to about 3,000 c.p.s. Except where otherwise specified or implied, the terms space and mark signals refer to such audio frequency signals.

For convenience in identification, the first frequency is sometimes referred to herein as the space-signal frequency and the second frequency is sometimes referred to herein as the mark-signal frequency. In accordance with this invention, signals of mark-signal frequency that are transmitted over the telephone system to the remote receiver, are employed to suppress effects of spurious signals such as echoes and noise of space-signal frequency received at the remote station and are applied directly to the local receiver to suppress effects of such spurious signals at the local station. As mentioned before, this is sometimes called an echo-squelch signal.

In this invention, mark signals are generated during each operating cycle and either terminate during the operating cycle or endure for only a short interval beyond the end of each operating cycle, so that after the transmission of a message has been completed, neither mark frequency signals nor space frequency signals are being transmitted over the telephone line. Because of this fact, at the termination of a message, the person at the other end of the line may start to transmit a message of his own without interference of any signal that might otherwise be supplied to the line at the first station.

In applicant's invention, each receiver unit is provided with an amplifier which responds to signals of mark-signal frequency above a predetermined threshold to reduce the gain of the receiver during mark intervals, so that the receiver unit will not operate the teleprinter at either the local station or the remote station in response to spurious signals of space-signal frequency. As a result, in accordance with this invention, even if echoes of space-signal frequency of considerable amplitude are received during a mark interval while the signal of mark-signal frequency is being received, the space signals are insufficiently amplified to operate the teleprinter.

The foregoing and other phases of applicant's invention will be understood from the following detailed description taken in connection with the accompanying drawings wherein.

FIGS. *9a–9g* are series of time-coordinated diagrams employed to explain the invention.

GENERAL DESCRIPTION

Figure 1:
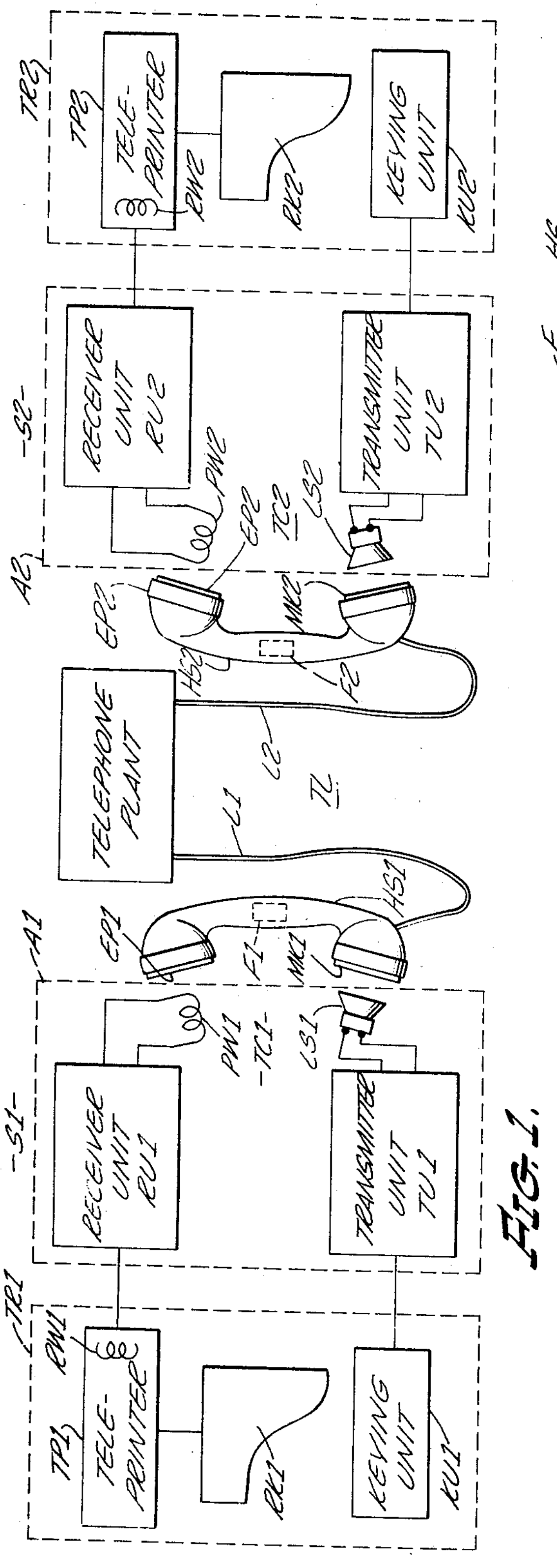
FIGURE 1 is a schematic diagram of a telephone system employing the invention.

Referring to the drawings and particularly to FIGURE 1, there is shown a telegraph system employing the invention and particularly employing two adapters A1 and A2 located at a local station S1 and at a remote station S2 respectively, for establishing communication between two teletypewriter units TR1 and TR2 at the respective stations over a telephone line TL. Each teletypewriter unit includes a keying unit and a teleprinter unit. Each keying unit KU1 and KU2 is of conventional type at each station respectively, and serves to generate patterns or groups of mark and space pulses corresponding to characters, such as letters, numerals, punctuation marks, and the like, plus synchronizing pulses, which are to be transmitted from one station to the other. Teleprinters TP1 and TP2 are also located at the respective stations for converting received patterns of pulses into corresponding characters so that the transmitted characters may be reproduced in visual form on corresponding records RK1 and RK2 at the respective stations. Each of the keying units KU1 and KU2 is of conventional type and includes a typewriter-type keyboard for manually generating signals corresponding to characters to be transmitted.

Each of the signals may be of a conventional type in which each pattern corresponding to a character consists of a train of seven successive pulses or signals, namely, a start pulse in the form of a space signal, five information pulses which may be either mark signals or space signals and a final stop pulse in the form of a mark signal. The start signal and each of the information signals is approximately 22 ms. (milliseconds) long. Each of the mark signals generated by a keying unit, KU1 or KU2, is in the form of a direct current while each of the space signals is in the form of a zero current. Each keying unit, which is of conventional form, comprises a plurality of sequentially operated switches which operate sequentially in various combinations in accordance with the character indicated by the key of the keyboard of the keying unit. The signals produced by the keying units are DC signals.

The teleprinter is also of conventional type. It includes means for converting character patterns into signals which operate the type-impressing units of a teleprinter, thus producing a record, on which the original characters are reproduced visibly in printed form, normally all in capital letters. Each receiver unit includes a relay having a winding RW1 and RW2 for actuating the teleprinter in the desired manner in accordance with the currents flowing in the winding. The circuit that includes each relay is also referred to as a "loop" and the current flowing in it as a "loop" current. The current flowing in the keying unit loop and the current flowing in the teleprinter loop are DC currents. However, audio-frequency currents are employed for transmitting signals from a transmitter unit to a receiver unit and means are employed at each station to convert DC loop currents at the keying unit into the corresponding audio frequency signals and to convert audio frequency signals received at the receiver unit into corresponding loop currents.

Each of the adapters A1 and A2 includes a telephone coupler TC1 and TC2 respectively for coupling the respective adapters to a corresponding telephone handset HS1 and HS2. The handsets are of conventional type which are adapted for transmitting and reproducing sound signals when lifted off a local switch hook. Each of the handsets HS1 and HS2 includes a microphone MK1 and MK2 of conventional type for converting sound waves into electrical signals that are transmitted over the telephone line TL. Each of the handsets HS1 and HS2 also includes an earphone EP1 and EP2 for converting received electrical signals into sound waves. Telephone handsets are conventionally provided with antiside-tone transformers F1 and F2 which interconnect the microphone and earphone of each handset to decouple them electrically so that a person using a handset will not hear his own voice through the receiver as he is holding it to his ear while he speaks.

Each of the telephone couplers TC1 and TC2 includes a miniature loudspeaker LS1 and LS2 for feeding sounds into the corresponding microphone MK1 and MK2 and also includes a pick-up coil PW1 and PW2 inductively coupled to the corresponding earphone EP1 and EP2. Such earphones employ magnetic windings on iron cores for causing metallic diaphragms to vibrate in accordance with electrical signals flowing through such windings. Each of the adapters A1 and A2 includes a transmitter unit TU1 and TU2 respectively and also includes a receiver unit RU1 and RU2 respectively. Each of the transmitter units TU1 and TU2 is employed to convert DC mark and space signals supplied by the corresponding keying unit KU1 and KU2 into corresponding sound signals which are applied to corresponding loud speakers LS1 and LS2. Each of the receiver units RU1 and RU2 is employed to convert sound signals detected by the correponding pick-up winding PW1 and PW2 into DC signals which are applied to corresponding load speakers LS1 and LS2. Each of the corresponding teleprinters TP1 and TP2.

As explained hereinafter, the loudspeaker LS1 and LS2 at each station S1 and S2 is inductively coupled to the pickup winding PW1 and PW2 at that station. This makes it possible for sound signals that excite the microphone MK1 or WK2 at that station to be applied to the receiver unit RU1 or RU2 at that station in spite of the fact that the handsets commonly employ anti-side-tone transformers F1 and F2 to prevent such coupling through the handset itself.

In use, when a series of characters are to be transmitted from a local station S1 to the remove station S2, the keyboard of the local keying unit KU1 is operated manually in the conventional manner, causing patterns of mark and space signals to be applied to the transmitter unit TU1. In turn, the local transmitter unit TU1 causes audio-frequency signals to be generated and to be applied to the local loudspeaker unit LS1 and then applied to the local microphone MK1 by virtue of the acoustic coupling between the loudspeaker LS1 and the microphone MK1. The electrical audio-frequency signals generated in the local microphone MK1 are transmitted over the telephone line TL1 to the remote earphone EP2. Alternating magnetic fields are generated there in accordance with the transmitted currents causing currents of corresponding frequency to be developed in the pick-up winding PW2 at the remote station S2. These currents are applied to the remote receiver unit RU2 where they are rectified, thereby generating a pattern of DC mark signals generated by the keying KU1 at the first station. In signals that are a replica of that series of transmitted signals generated by the keying KU1 at the first station. In effect, in normal operation, the loop current at the remote teleprinter TP2 is a duplicate of the loop current in the local keying unit KU1 which is being operated. The transmitted signals are thereby re-produced to operate the teleprinter to cause the transmitted characters to be printed on the remote record RK2.

At the same time, the signals generated by the local transmitter unit TU1 are impressed upon the local receiver unit RU1. These audio-frequency signals are transformed by the receiver unit RU1 into a trail of DC mark signals and DC space signals which operate the teleprinter TP1 at the local station to print a local record of the transmitted signals. In this case, the loop current at the local teleprinter TP1 is a duplicate of the loop current in the local keying unit KU1. As a result, a person transmitting at either station generates, at his own station, a local record of the transmitted signals and thus has a record of the message that is being transmitted by him.

For convenience, when describing parts below, which apply equally well to units at either the local station S1 or the remote station S2, the various parts which have been previously identified in FIG. 1 will be referred to without subscripts. Thus by way of example, when reference is made to a transmitter unit TU, the description applies equally to either transmitter unit TU1 or transmitter unit TU2.

The signal developed in each transmitter unit TU is a modulated audio-frequency signal representative of the transmitted wave trains. In practice, the space-frequency parts of the signal are intended to be of the on-off type wherein each DC space signal from a keying unit causes the transmitter unit to which it is applied to generate a signal or space-signal frequency at its output. In practice, a suitable audio-frequency is 1800 c.p.s. This frequency is selected since it lies in the range of transmission of a telephone system and is different from any signal normally used on a telephone system for transmitting control signals for operating any part of the telephone system.

In this invention, audio-frequency signals of a different frequency are transmitted during the mark intervals and these audio-frequency signals are also of a frequency that lies within the transmission band of the telephone system and also differs from a frequency associated with any normally used control signals. A suitable frequency is 1400 c.p.s. For best results, the mark-signal frequency and space-signal frequency are anharmonic, that is, neither is an integral multiple of the other. In this invention, signals of mark-frequency, that is of 1400 c.p.s., are employed to disable the receiver units during a mark interval following each transistor from a space signal to a mark signal so that any extraneous signals such as random noise, echoes, or cross-talk cannot operate a receiver unit while so disabled. In one form of the invention, the mark-frequency signal is transmitted for a period of less than a pulse interval but longer than the usual delay time of an echo. For this purpose these mark-frequency signals are made about 11 ms. long. This period is greater than the echo time commonly observed on telephone transmission lines of intermediate lengths. In another form of the invention, the mark signal is sustained through each operating cycle except while a space signal is being generated by the transmitter unit.

COUPLER

Figure 2:
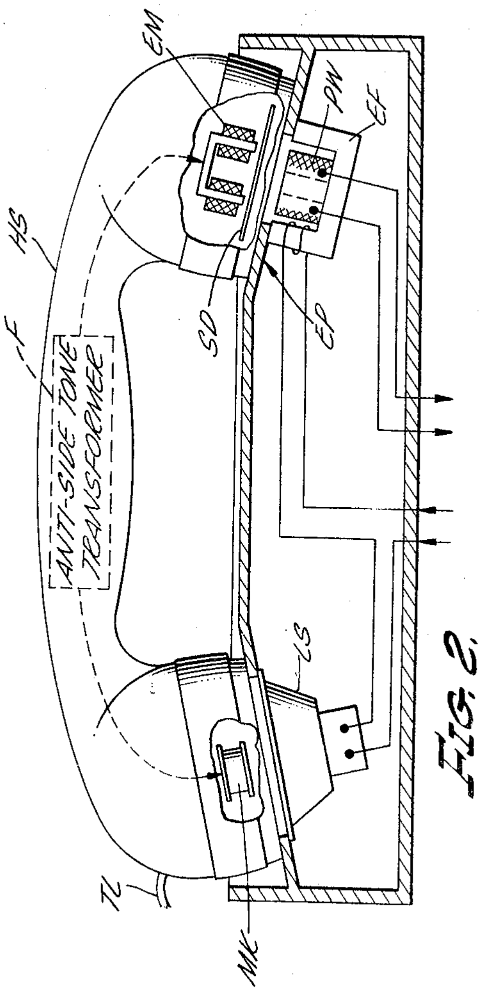
FIG. 2 is an isometric view of a telephone coupling unit in use.

To facilitate coupling of the transmitter-receiver unit to a telephone handset, the coupling elements, namely the pick-up winding PW and the miniature loudspeaker LS, are mounted in a box or cradle in positions to facilitate coupling to a handset as illustrated in FIG. 2. There, it will be noted that the loudspeaker LS and the pick-up winding PW are supported and oriented in a box in such positions as to facilitate close coupling with the telephone microphone MK and the telephone earpiece EP. The telephone earpiece comprises a soft iron diaphragm SD which is located directly opposite an electromagnet EM which is employed to actuate the diaphragm SD to produce sound waves. In order to obtain efficient coupling with the earphone EP, the pick-up winding PW is mounted on the center leg of an E-shaped frame EF with the free ends of the three legs of the frame facing and lying close to the diaphragm SD. One of the two wires leads from the transmitter unit TU to the miniature loudspeaker LS and is looped around one of the outer legs of the core EF of the pickup winding PW. A unit of this type is employed at each of the stations where a telegraph system embodying this invention is to be used.

RECEIVER UNIT

Figures 3, 4:
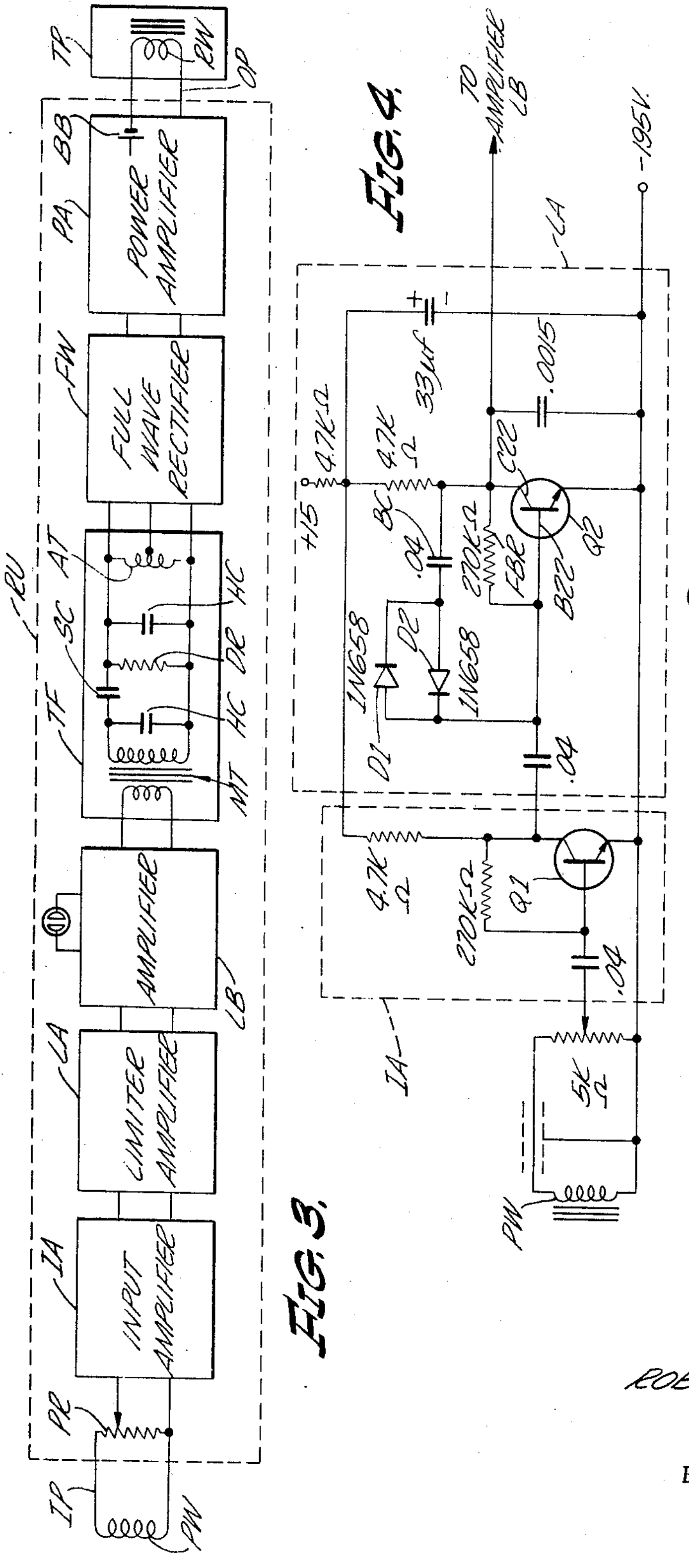
FIG. 3 is a block diagram of a portion of the system.
FIG. 4 is a wiring diagram of a portion of a receiver.

A receiver unit RU of the type employed in this invention is shown in FIG. 3. Each receiver unit RU has an input IP into which signals are passed from a pick-up winding PW and an output OP from which signals are fed to the relay winding RW of a teleprinter TP. The receiver unit includes a level-adjusting potentiometer PR, an input amplifier IA, a limiter amplifier LA, an additional amplifier LB, a tuned filter TF, a full-wave rectifier FW, and a power amplifier PA connected in sequence between the input IP and the output OP. The input amplifier IA is of the Class A type. The limiting amplifier LA is of the symmetrical limiting type which clips off the peaks of signals on both the positive and negative excursions thereof.

The amplifier IA is designed to amplify signals selectively over a wide band of frequencies from 1,000 to 2,000 c.p.s. amplifying both space-signal frequencies and mark-signal frequencies of 1,800 c.p.s. and 1,400 c.p.s. respectively by a relatively large amount. However, 600 c.p.s. dial tones and other supervisory signals present on telephone lines during certain stages of operation are also amplified but to only a relatively small amount. By amplifying the mark and space signals to a high degree in the input amplifier IA and clipping the signals in the limiter amplifier LA, the output of the limiter amplifier is essentially a clipped type, whether the incoming signal be of 1400 c.p.s. or of 1800 c.p.s.

The limiter amplifier LA is of a special type such that when steady state signals of mark frequency and high amplitude are being amplified, the gain of the limiter amplifier is in effect reduced to render the limiter amplifier LA insensitive to signals of other frequencies and of lower amplitude. Thus, when strong signals of the mark frequency 1400 c.p.s. are impressed upon the limiter amplifier, weak signals of space frequency 1800 c.p.s. are only feebly amplified in the limiter amplifier. On the other hand, when strong space signals of 1800 c.p.s. predominate, signals of high amplitude and space frequency appear in the output of the limiter amplifier.

The shape of the clipped sinusoidal wave could be rectangular, trapezoidal, or merely cut off slightly at the peak or otherwise limited, depending upon the maximum amplitude of the signal being received by the limiting amplifier LA and in part on the gain of the transistor Q2.

During the normal operation of the system the signals of mark frequency are strong and signals of space frequency are weak during mark frequency intervals; and signals of space frequency are strong and signals of mark frequency are weak during space frequency intervals. Furthermore, the amplitude of the signals impressed upon the input of the limiting amplifier are established at such a value that strong limiting occurs thus producing "nearly" square waves. In either event, the amplitude of the signals appearing at the output of the limiting amplifier during space and mark intervals is established at a level which causes the signals developed in the output of the power amplifier PA to apply the required loop currents to the teleprinter TP.

The square wave output of the limiter amplifier is then amplified further in the amplifier LB. The output of this amplifier is fed through an impedance-matching transformer MT at the input of the tuned filter TF. This filter is a band-pass filter of $\pi$ configuration that has about a 200 c.p.s. band width centered at 1800 c.p.s. This filter is of the nonringing type, thus facilitating equalized rise and decay times when responding to bursts of signals of 1800 c.p.s. The tuned filter includes input and output capacitors HC that respectively tune the secondary winding of the input impedance-matching transformer MT and the output inductor or center-tapped transformer AT and it also includes a series capacitor SC connecting the two ends. It also includes a damping resistor DR connected across the shunt capacitor HC at the output.

When a signal of space frequency is being received by a pick-up winding PW, a relatively large sinusoidal signal of 1800 c.p.s. appears across the transformer AT at the output of the tuned filter TF. But when a signal of mark frequency, 1400 c.p.s. is being received by the pick-up winding, a relatively small signal appears across the transformer AT. The small amplitude of the signal appearing at the output of the filter TF is due partly to the attenuating action of the filter on the signals of 1400 c.p.s. and partly to the action of the limiter amplifier in attenuating signals of space frequency when signals of mark frequency having an amplitude above a predetermined threshold are being received.

In either event, the signal appearing across the inductor AT is applied to a full-wave rectifier FW and is converted to a DC signal of corresponding amplitude which is then fed to a power amplifier PA and thence to the relay winding RW of the teleprinter TP. Suitable means, here represented by a bias battery BB is employed to energize the relay winding to produce a loop current therein of mark level when only a small audio frequency signal is being applied to the input of the power amplifier PA. This condition exists when a mark signal is being received or no signal at all. But when a space signal is being received a large current appears in the output of the power amplifier of such a magnitude as to neutralize or inhibit that loop current.

Detailed wiring diagrams of an input amplifier IA and a limiter amplifier LA are shown in FIG. 4 where the values of various circuit elements found to be suitable in one embodiment of the invention, are given. As indicated, the input amplifier IA utilizes a single transistor Q1 connected to operate in the Class A mode. Also, the limiter amplifier LA employs a single transistor Q2. The two transistors, Q1 and Q2 may be of the NPN type known as 2N3053. The collector C22 of the transistor Q2 is coupled to its base B22 through a blocking capacitor BC and a pair of diodes D1 and D2 that are connected in parallel but with their polarities reversed. The two diodes D1 and D2 are of the silicon type, whereby each of them has a high resistance when the voltage across it is less than 0.7 volt, and a negligible resistance when the voltage across it is greater than a predetermined amount of about 0.7 volt. Thus the composite resistance of the two diodes D1 and D2 is high when the peak-to-peak value of the AC voltage across them is below 1.4 volts but is low when the peak-to-peak voltage exceeds this amount. The voltage 1.4 volts acts as a clipping range. Clipping occurs when the peak-to-peak amplitude of the signal across the output of the transistor Q2 exceeds a predetermined threshold corresponding to 1.4 volts.

The feed-back resistor FBR that connects the collector C22 with the base B22 is chosen of such a value as to cause the limiting amplifier LA to operate in the Class A mode below the clipping level. When a small signal is applied, the limiting amplifier LA operates in the Class A mode without clipping. But when a large signal is applied, the signal appearing across either of the diodes D1 or D2 may exceed 0.7 volt, causing one diode or the other to conduct, thereby automatically adjusting the gain of the transistor Q2. When a relatively large signal of mark frequency 1400 c.p.s. is applied, a clipped or square-wave signal of 1400 c.p.s. appears at the collector and any 1800 c.p.s. component of the signal which is present is amplified only slightly. But when a signal including a large 1800 c.p.s. component is applied to the limiter amplifier, the output at the collector is a clipped or square-wave signal of 1800 c.p.s. and only a very small signal of 1400 c.p.s. appears at the collector.

In practice, the signals to be suppressed are very small compared with the signals to be transmitted to the full-wave rectifier. By virtue of the combined action of the limiter amplifier and the tuned filter, sharp discrimination is obtained so that only transmitted signals of space-signal frequency are of sufficient strength to inhibit loop current in the relay winding RW to cause a space indication to be produced in response to a space signal received by the pick-up winding PW. In practice, the power amplifier PA is biased to provide the desired separation of the mark and space DC signals that are supplied to the relay winding RW to enable it to operate the teleprinter in the conventional manner.

TRANSMITTER UNIT FORM 1

Figure 5:
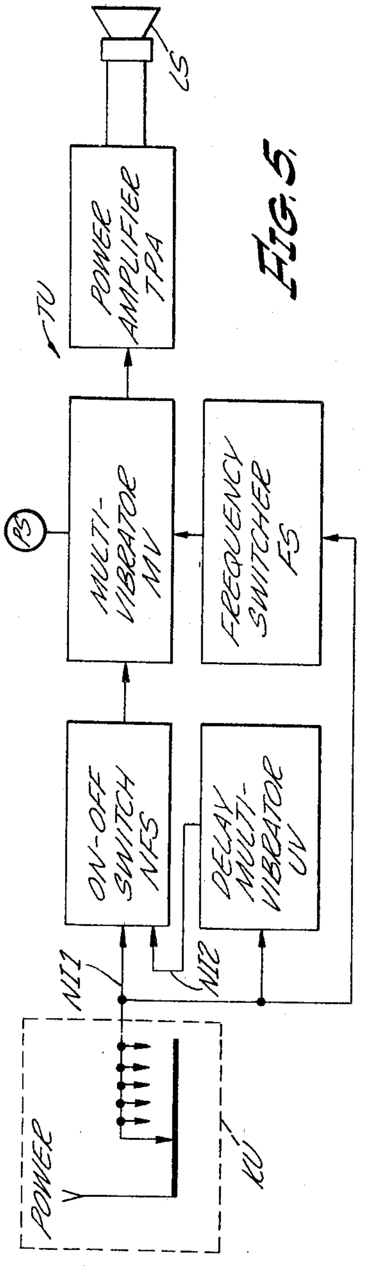
FIG. 5 is a block diagram of a transmitter unit.

Referring to FIG. 5, there is shown a transmitter unit TU which responds to trains of space and mark signals from a keying unit KU to produce audio-frequency signals which are supplied to a local loudspeaker LS. The signals from the keying unit KU consist of a series of square waves involving transitions between a mark level of 30 ma. and a space level of 0 ma. Since the input impedance of the transmitter unit is 330 ohms, this corresponds to a mark level of 10 volts and a space level of 0 volt.

In each transition from mark level to space level, a negative-going pulse is applied to the input of the transmitter unit TU. But in each transition from space level to mark level, a positive-going pulse is applied.

The transmitter unit TU includes a multivibrator MV which is controlled by a frequency switcher FS to condition the multivibrator to generate signals of either 1800 c.p.s. during a space interval or 1400 c.p.s. during a mark interval. The transmitter unit TU also includes an on-off switch NFS for energizing the multivibrator MV to oscillate at such a frequency at certain times as explained below. In addition, the transmitter unit TU includes a delay multivibrator, or a univibrator UV, which acts with the on-off switch NFS to render the multivibrator operative to oscillate during each space interval and at least a fraction of a mark interval following it. As a result, with this arrangement, the multivibrator applies an 1800 c.p.s. space signal to the power amplifier TPA during each space interval and a 1400 c.p.s. mark signal to the power amplifier during a portion of a mark interval that follows a space interval. The two signals have about the same amplitude.

In effect, the on-off switch NFS is an OR gate which causes power to be delivered from a power source PS to the multivibrator MV when a space signal (0 volt) is applied to input NI1 from the keying unit KU or a 0-volt or negative signal is applied to the input NI2 from the univibrator UV, and which disconnects the multivibrator MV from the source of power PS when positive signals are applied to both inputs NI1 and NI2.

The output of the multivibrator is fed through the power amplifier TPA to the loudspeaker LS. The power amplifier is tuned broadly in the neighborhood of 1600 c.p.s. so as to round off the square waves developed by the multivibrator to apply nearly sinusoidal waves of audiofrequency of either 1800 c.p.s. or 1400 c.p.s. to the loudspeaker LS depending on the frequency at which the multivibrator MV is oscillating.

Figure 6:
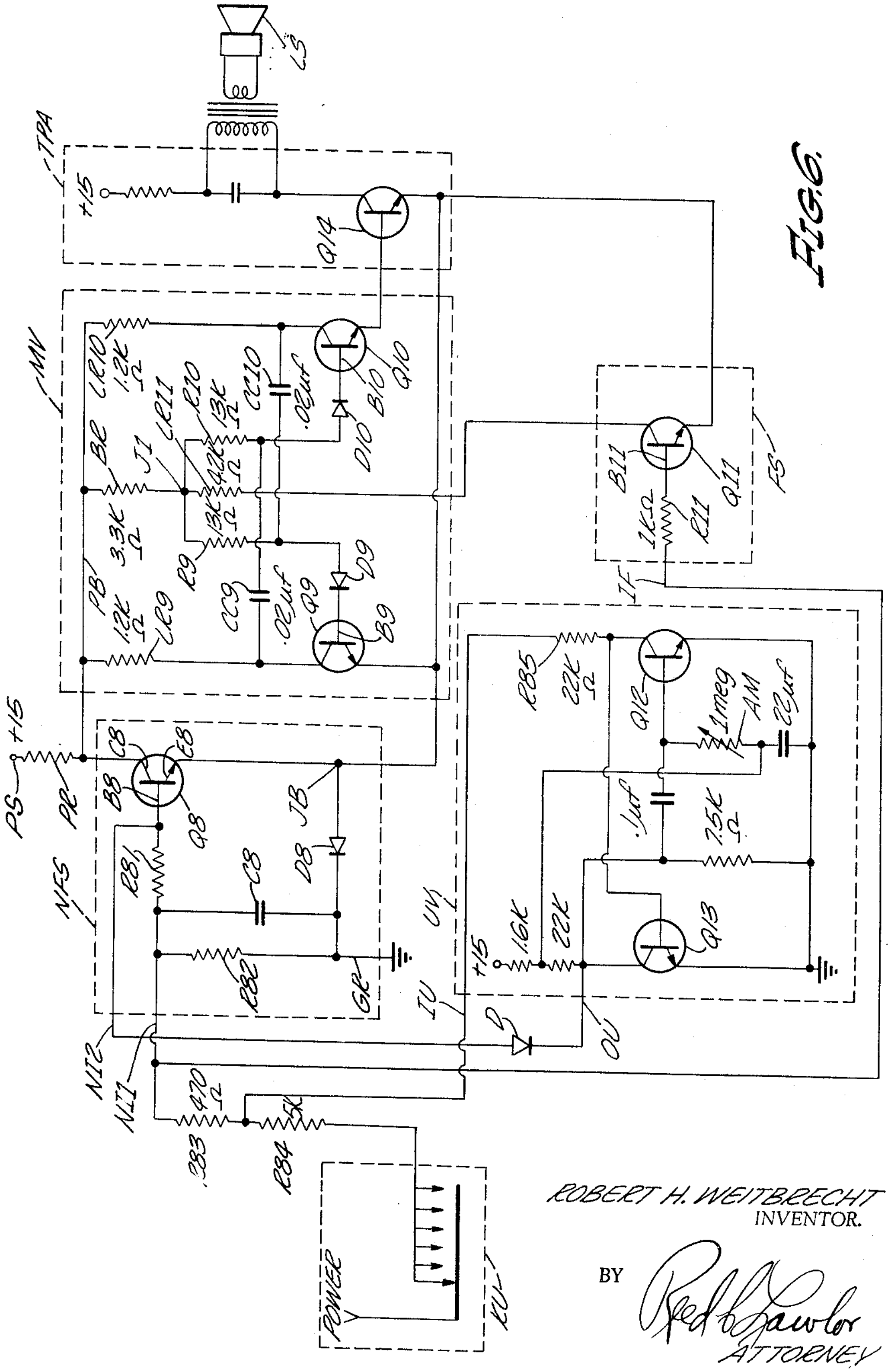
FIG. 6 is a detailed wiring diagram of a transmitter unit.

In FIG. 6 there is shown a detailed wiring diagram of such a transmitter unit. In this diagram, the various sections are labeled as in FIG. 5 and the values that have been found suitable to operate the telegraph system are indicated.

The multivibrator MV is of conventional type and employs a pair of cross-coupled transistors Q9 and Q10. Each of the corresponding bases B9 and B10 is connected to the power bus PB through a corresponding diode D9 and D10 and a resistor R9 and R10, these two resistors being connected to a common ballast resistor BR. The collector of each of the transistors Q9 and Q10 is connected to the diodes D10 and D9 respectively at the input of the other transistor through a corresponding coupling capacitor CC9 and CC10. The collectors are connected to the power bus PB through corresponding load resistors LR9 and LR10.

A frequency shifter FS is connected to change the voltage at the junction J1 between the two resistors R9 and R10, and the ballast resistor BR. The frequency shifter, FS is in the form of a transistor Q11 that is connected through a load resistor LR11 to that junction. The frequency shifter FS is so designed that when a positive voltage is applied to its base through a resistor R11, the transistor conducts but when a zero voltage is applied to the resistor R11, the transistor Q11 is nonconducting. As a result of the action of mark or space signals applied from the keying unit KU to the frequency switcher FS, the multivibrator MV is tuned to oscillate at constant amplitude at either a mark-signal frequency of 1400 c.p.s. or a space-signal frequency of 1800 c.p.s. as the case may be. The power bus PB is connected to the collector of a transistor Q8 in the on-off switch NFS, so that when the transistor Q8 is conducting, the multivibrator MV is powerless to oscillate. But when the switch Q8 is nonconducting, the full voltage from a power source is applied to the multivibrator MV through a ballast resistor PR.

The on-off switch has first and second inputs NI1 and NI2. The base of the transistor Q8 is connected to ground through resistors R81 and R82, the latter resistor being shunted by a capacitor C8. The junction between the two resistors R81 and R82 is connected directly to the first input NI1. The collector of the transistor Q8 is connected to the B+ terminal of the power supply PS through the ballast resistor PR. A diode D8 is connected between the emitter E8 of the transistor Q8 and a ground terminal GR of the power supply. The emitters of the transistors Q9 and Q10 of the multivibrator and Q14 of the power amplifier are connected to the junction JB between the emitter E8 of the transistor Q8 and the diode D8. The power bus PB of the multivibrator MV is connected to the collector C8 of the transistor Q8.

The univibrator UV may be of conventional type which responds to a positive-going signal applied to its input IU to produce a negative pulse at its output OU for a delay interval of predetermined duration. In this case, the univibrator is provided with adjustment means AM in the form of a variable resistor for varying the delay interval that is the length of the negative pulse. In one embodiment of this invention, the resistor AM is set so that the duration of the delay interval is somewhat less than the interval of one information-pulse interval. For example, when employing a telegraph system utilizing information-pulse intervals of 22 ms., the length of the negative pulse may be set at 11 ms. As a result, in such a case, whenever a space pulse is followed by a mark pulse, the delay univibrator UV applies a negative or 0 volt signal to the input NI2 of the on-off switch NFS throughout the following mark-pulse interval for a period of 11 ms. However, if the next following interval after a space-pulse interval is also a space-pulse interval, the univibrator merely remains ready to act during the next space-to-mark transition. Thus power is supplied to the multivibrator throughout each space interval and for a fraction of a mark signal immediately following a space signal.

In this embodiment of the invention, signals are applied to the transmitter unit from the keying unit KU. The output of the keying unit is either a zero voltage or some predetermined positive voltage such as 10 volts. In either event, a signal is applied from the keying unit through a resistor R84 and the resistor R83 to the input NI1 of the on-off switch NFS and through the resistor R84 to the input IU of the univibrator UV, and from thence to a resistor R85 to the collector of the transistor Q12.

With this arrangement, whenever the keying unit KU is idle (on mark), that is before it is operated to generate a message in the form of sequence of character patterns, a plus voltage is supplied from the keying unit KU to the input NI1 of the on-off switch NFS, and to the input IU of the univibrator UV and to the input IF of the switching unit. Assuming that considerable time has elapsed since the previous character pattern was generated, the univibrator UV is in its quiescent condition, in which the voltage at its output is positive. Under these conditions, a plus voltage is applied to the base B8 of the transistor Q8 of the on-off switch NFS rendering the transistor Q8 conductive and rendering the multivibrator MV powerless. In this condition, the transistor Q11 of the frequency switcher FS is also conductive, tuning the multivibrator MV to a mark-signal frequency of 1400 c.p.s. However, because of the condition of the on-off switch, the multivibrator is not oscillating.

When the keying unit is operated to produce a character pattern, a start-pulse (space) signal applies a 0 voltage to the input NI1 of the on-off switch NFS, the input IU of the univibrator, and to the input IF of the frequency switcher FS. When the start (space) pulse is initiated, the positive voltage is removed from the output of the keying unit causing transistor Q8 to become nonconducting, thus effectively connecting the power bus of the multivibrator MV to the power supply PS and rendering the multivibrator operative to oscillate at the required frequency. At the same time, the removal of the positive voltage from the base of the transistor Q11 of the frequency switcher FS renders the transistor Q11 nonconductive, tuning the multivibrator MV to the space frequency of 1800 c.p.s. At the same time, the removal of a positive signal from the input IU of the univibrator UV causes it to remain inoperative during the space interval.

When a mark pulse follows at the end of the start-pulse interval that application of the positive pulse to the base B11 of the transistor Q11 renders that transistor conductive, changing the tuning of the multivibrator MV from 1800 c.p.s. to 1400 c.p.s. Even though the positive voltage is applied to the input NI1, a zero voltage is still applied to the base B8 of the transistor Q8 from the output OU of the univibrator as a result of clamping effect via diode D. As long as the zero voltage appears in the output of the now-operating univibrator, the transistor Q8 remains nonconductive and power is still applied to the tone-generating multivibrator. While the mark pulse still exists, the output of the recycling univibrator swings positive so that the base B8 of the transistor Q8 becomes positive and the transistor Q8 conducts, thereby removing power from the multivibrator MV.

In an alternate method of operating the telegraph system with the transmitter unit illustrated in FIG. 5, the keying unit KU and the univibrator UV are so designed that they connect the multivibrator MV to the power supply throughout the entire period of each character pattern, that is, for a duration of about 150 ms. or somewhat longer. In one way to accomplish this result the delay multivibrator may be of the type which is responsive to a negative-going signal and hence responds to the initiation of the start signal and the delay multivibrator may be of a type that generates a 0-volt signal for 150 ms. or more during the operating cycle. In another way of accomplishing this result the delay interval of the univibrator UV of FIG. 6 may be made equal to 150 ms. or somewhat longer. In this form of the invention then, the multivibrator operates at 1400 c.p.s. throughout the entire operating cycle of each character pattern, except while a space signal is being applied to the transmitter unit TU2 from the keying unit KU and sometimes for a somewhat longer period.

Figure 7:
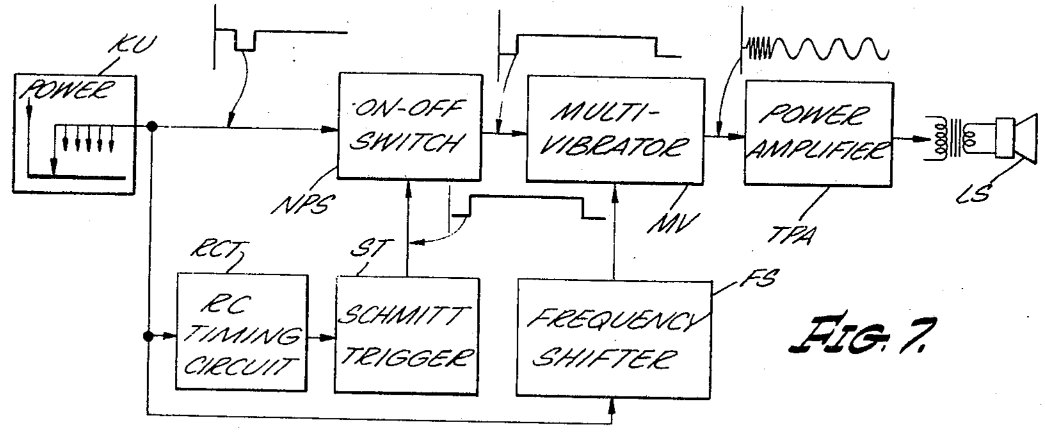
FIG. 7 is a block diagram of another form of transmitter.
Figure 8:
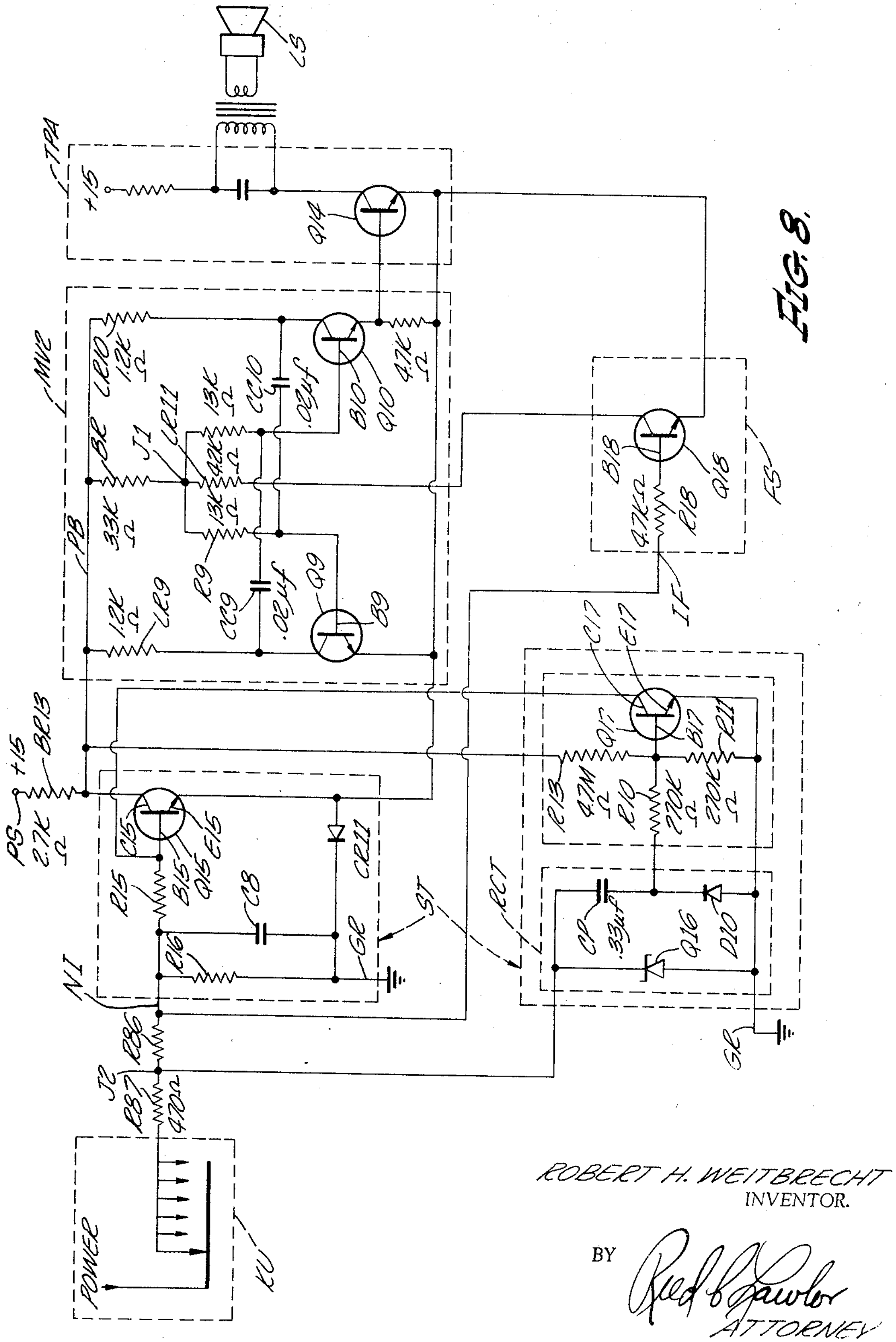
FIG. 8 is a detailed wiring diagram of the form of transmitter of FIG. 7.

In another method of achieving this result, the univibrator UV of FIG. 6 is replaced by an RC timing circuit RCT and a Schmitt trigger circuit ST as illustrated in FIG. 7. A specific circuit suitable for operating the telegraph system of this invention in this manner is illustrated in FIG. 8. In this form of the invention, the transistor Q15 that acts as the switch of the on-off switch NFS is part of the Schmitt trigger circuit.

The charging circuit RCT includes a Zener diode Q16 connected between the junction J2 and ground GR. A capacitor CP and a diode D10 are connected in parallel across the Zener diode Q16 with the diode D10 connected in the reverse voltage direction. The diode is shunted by two resistors R10 and R11 connected in series.

The Schmitt trigger employs two transistors Q17 and Q15 connected as shown. The base B17 is connected to the junction between the two resistors R10 and R11 and is connected to a further voltage divider resistor R13 and a ballast resistor BR13 to the positive terminal of the power supply PS. The collector C17 of the transistor Q17 is connected directly to the base B15 of the switching transistor Q15. This base B15 in turn is connected to ground through a current limiting resistor R15 and another resistor R16. The junction between these two resistors is connected to the input NI. The keying unit KU is connected to the input NI of the Schmitt trigger ST through two resistors R87 and R86. The input NI is also connected to the input IF of the frequency switchers FS and thence to the base B18 of the switching transistor Q18 through a current limiting resistor R18. The junction J2 between the resistors R87 and R86 is connected to the charging circuit RCT.

When operating with this system signals are applied simultaneously to the input NI of the Schmitt trigger circuit and to the timing circuit RCT and also the input IF of the frequency switchers FS. While a DC mark signal is being applied while the system is in an idle or quiescent condition, the base B15 of the switching transistor Q15 is positive, rendering the transistor Q15 conductive and maintaining the multivibrator MV disconnected from the power source.

While the mark signal voltage is supplied, current flows through the Zener diode Q16 so that a corresponding fixed voltage, in this case 6 volts, appears across the charging capacitor CP and the diode D10. Almost the full voltage of 6 volts is applied across the charging capacitor because the circuit connections are such that the base B17 of the transistor Q17 and the voltage across the diode D10 are very low.

At this time the transistor Q18 of the frequency switcher is conductive.

When the start pulse of a character pattern is produced, a space signal is applied and the incoming voltage from the keying unit KU is reduced to zero. At this moment, the voltage on the base B15 is reduced, rendering the transistor Q15 nonconductive and applying power to the multivibrator MV. At the same time, the voltage on the base B18 of the switcher transistor Q18 is reduced to zero, rendering this transistor nonconductive. As a result of the joint action of the switcher transistor Q15 and the frequency switching transistor Q18, the multivibrator MV oscillates at 1800 c.p.s. during each space interval. At the commencement of an operating cycle, the voltage on the base B17 of the transistor Q17 is driven in a negative direction by virtue of the fact that the voltage at the junction J2 drops to zero and the fact that a voltage of 6 volts had previously been developed across the charging capacitor CP.

At this time, the charge on the capacitor CP discharges rapidly through the resistors R16, R86 and the diode D10. When a mark signal is applied, a positive voltage appears at the junction J2, thus applying 6 volts across the charging capacitor CP and the diode D10 reverse biasing the diode. At this time, a positive voltage is applied to the base B17 of the transistor Q17 rendering that transistor conductive and grounding the base B15 of the transistor Q15 thus continuing the transistor Q15 in its nonconducting condition and maintaining the multivibrator MV in oscillating condition. However, at this same time, the voltage on the base B18 of the transistor Q18 rises rendering this transistor conductive and causing the multivibrator MV to oscillate at 1400 c.p.s.

While the capacitor CP is being charged during a prolonged or idle mark condition, the base B17 of the transistor Q17 remains biased in the forward condition. Finally, the charging current on the capacitor CP decreases to the point where transistor Q17 becomes reverse biased, thus forward biasing the switching transistor Q15 and, by regenerative action through the resistor R13 via transistor Q17 causing the switching transistor Q15 to become rapidly conductive, thus shutting off the power of the multivibrator MV.

As a result of the action of the charging circuit, RCT and the Schmitt trigger circuit SC, the multivibrator generates signals at 1400 c.p.s. at all times during the transmission of a character pattern except while space signals are being applied and thus generates signals of 1400 c.p.s. during all mark intervals of a character pattern and of 1800 c.p.s. during all space intervals of each character pattern.

Each time a space pulse is initiated, the capacitor CP is discharged. In the absence of subsequent discharge, the Schmitt trigger circuit ST operates after an interval of 150 ms. to shut off the power being supplied to the multivibrator unit MV2. Because of the fact that space pulses may occur after the start pulse, and usually do, it is possible that the multivibrator will remain energized after the close of an operating cycle for as much as 99 ms. However, this does no harm. If another character is transmitted immediately, each time a space pulse is generated by the keying unit, the multivibrator will operate at 1800 c.p.s. and reinitiate the operation of the trigger circuit. On the other hand, if the end of a message has been reached, the transmission of a signal of mark frequency for a short time beyond the end of the message does not interfere with the operation of a system. In any event, the line becomes silent shortly after the transmission of a message has been completed so that the line may be used for transmitting another message in either direction on the line.

OPERATION AND SUMMARY

The operation of a telegraph system in accordance with this invention may be readily understood by reference to FIG. 9 where a series of time-coordinated graphs are presented to bring out the relationship between events occurring in a keying unit, a transmitter unit, and a teleprinter. In this graph, the invention is explained in relationship to the transmission and reception of a wave pattern representing the alphabetical letter A.

Figure 9A:
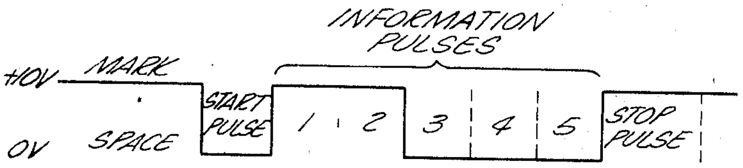

FIG. 9*a* represents the signal supplied by the keying unit. Here it will be noted that the signal is in the form of a series of square waves having a lower level of 0 volts and an upper level of +10 volts. The exact voltage supplied by the keying unit depends on the resistance of the transmitter unit TU into which current is fed from the keying unit. As previously stated, each character pattern endures for one operating cycle of 163 ms. and consists of seven pulses; a start pulse, five information pulses, and a stop pulse. The start pulse and the information pulses are all of the same duration, namely approximately 22 ms. The stop pulse endures for 31 ms. Where two or more mark pulses follow each other without intervention of a space pulse, they appear to be a single pulse of longer duration. Similar remarks apply where two or more space pulses follow each other without intervention of a mark pulse.

Figure 9B:
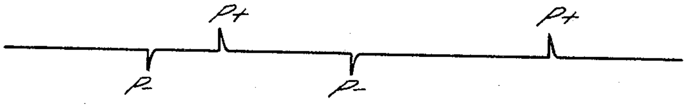

FIG. 9*b* illustrates the nature of the pulses that are supplied to the base of the input transistor Q12 of the univibrator UV. It is to be noted that each time the input voltage to the transmitter unit TU changes from a mark level of 10 volts to a space level of zero volt, a negative going pulse P− is applied to the univibrator and each time the signal applied to the transmitter unit changes from a space level to a mark level, a positive going pulse P+ is applied to the univibrator. In the system of FIGS. 5 and 6, the positive-going pulses P+ triggers the univibrator into operation and the negative-going pulses are ineffective. In the second form of the invention illustrated in FIG. 8, a negative-going pulse is applied momentarily to the base B17, but because the condenser CP discharges rapidly, there is negligible effect on the Schmitt trigger action.

Figure 9C:
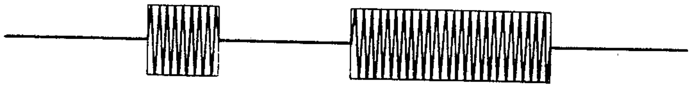

FIG. 9*c* illustrates how bursts of 1800 c.p.s. signals would be applied to the telephone line during space bits while the input to the transmitter unit is at the space level and no signal would be applied to the telephone line while the input signal is at the mark level, if the multivibrator MV were operative only during the space bits.

Figure 9D:
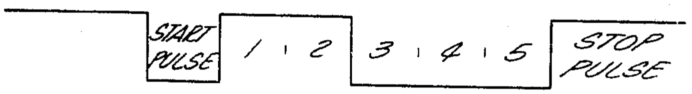

FIG. 9*d* indicates how the current applied to the teleprinter relay TR would vary in such a case. It is to be noted that the wave form of the pulsating DC signal applied to the teleprinter is a replica of the transmitted wave form. This of course is a desirable condition since it enables a teleprinter to accurately print a transmitted message.

Figure 9E:
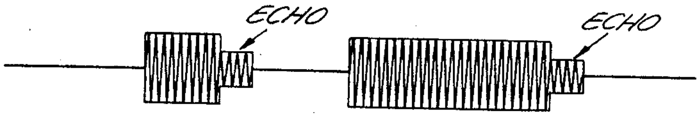

FIG. 9*e* illustrates how an echo produced by a burst of 1800 c.p.s. signals can exist on a telephone line after the termination of a space bit and during the occurrence of a mark bit. Such echoes and other noise appearing on the line and having a component in the neighborhood of 1800 c.p.s. can also affect a receiver unit RU and hence cause errors to occur in the wave form of the DC signal applied to the teleprinter. Such echoes and other noise can therefore interfere seriously with the transmission of messages from a transmitter unit to receiver unit.

Figure 9F:
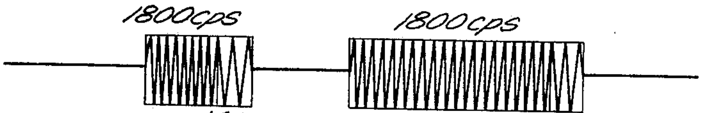

In FIG. 9*f* a wave form is shown which indicates how a signal of 1400 c.p.s. is generated by a transmitter unit TU for a short interval of time following a change of a character pattern from the space level to a mark level. In this case, the burst of 1400 c.p.s. audio frequency signal persists for about 11 ms., namely, about half a bit interval beyond the end of each space interval. Such an arrangement is very effective for eliminating echoes arising from reflection of 1800 c.p.s. bursts of energy during short intervals after a transition from a space bit to a mark bit has occurred.

Figure 9G:
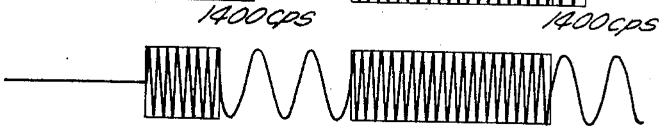

FIG. 9*g* illustrates what occurs when a 1400 c.p.s. signal exists throughout the duration of a character pattern except when space bits are being transmitted. This is the type of signal that is transmitted while the system is operating in accordance with the form of the invention illustrated in FIGS. 7 and 8 or when the delay univibrator of FIGS. 5 and 6 is operated with a delay interval of 141 ms. or more.

In all forms of the invention, the same type of receiver is used, namely, one in which a receiving element is employed which responds to produce space signals during space intervals and which is rendered inoperative to produce space signals while mark signals above a predetermined threshold are being received. The inoperativeness of the receiving device to space signals during mark intervals is brought about by the fact that mark signals are transmitted over the line which are of a different frequency than space signals but are about as strong as space signals and they serve to reduce the sensitivity of the receiver system to the weaker spurious signals of space frequency that are received during mark intervals.

In practice, the sensitivity of the receiving unit is adjusted to a level so that only space signals of an amplitude corresponding to bona fide space signals are ordinarily strong enough to actuate a teleprinter relay TR, and strong mark signals arriving in place of bona fide space signals can reduce the gain of the amplifier to render it insensitive to weak space signals such as those typical of echoes. In this way, spurious space signals that are impressed upon a receiver unit while a normal mark signal is also received there, have no effect on the teleprinter.

While the invention has ben described with particular reference to a teleprinter system, it will be understood that in some of its aspects the invention is also applicable to other telegraph systems in which sequences of mark and space signals are employed to transmit information from a local station to a remote station. Furthermore, while the invention employs ordinary telephone lines in the best embodiment thereof now known, it will be understood that some phases of the invention will also be applied to other types of systems for transmitting signals from one station to another.

While the invention has been described with particular to only two forms of transmitter units and only a single form of receiver unit, it will be understood that the invention may be embodied in many other forms. It is therefore to be understood that the invention is not limited to the specific forms thereof which have been illustrated and described herein but that many modifications may be made therein without departing from the invention as defined by the appended claims.

The invention claimed is:

1. In a system of signaling involving the transmission of series of coded signals from a transmitter station to a receiver station under circumstances under which random noise, echoes, or other extraneous signals may also be received at the receiver station, and wherein said coded signals are in the form of trains of mark signals and space signals:

means at the transmitter station for generating a train of mark signals and space signals in successive signal intervals;

means responsive to the initiation of each of said space signals for generating a transmitted space signal of a first frequency during the interval containing said each space signal;

means for generating a transmitted mark signal of a second frequency during the next following signal interval provided no space signal is being generated during said last mentioned signal interval;

receiver means located at the receiver station for receiving transmitted space signals and transmitted mark signals of the respective first and second frequencies;

said receiver means including a receiver amplifier responsive to both types of transmitted signals;

means in each said amplifier responsive to received signals of said second frequency having an amplitude above a predetermined threshold for clipping such second-frequency signals and for simultaneously amplifying signals of said first frequency only a small amount compared with the amplification that would occur in the absence of such second-frequency signals above said threshold; and means including a filter in the output of said each amplifier and tuned to one of said frequencies for generating a received train of mark and space signals corresponding in time and duration to the generated mark and space signals.

2. A system of signaling as defined in claim 1 including means responsive to the received train of signals appearing in the output of said amplifier for producing visual indications corresponding to the respective trains of generated signals.

3. In a system of signaling as defined in claim 1 including means for adjusting the amplitude of received signals relative to said threshold.

4. In a system of signaling involving the transmission of series of coded signals from each of two stations to the other by means of a transmitter located at each station and a receiver located at each station, under circumstances under which random noise, echoes, or other extraneous signals may be received by such receivers and wherein said coded signals are in the form of trains of mark signals and space signals:

means associated with the transmitter at each station for generating a train of mark signals and space signals in successive signal intervals;

means in each transmitter responsive to the initiation of each of said space signals for generating a transmitted space signal of a first frequency during the interval containing said each space signal;

means for generating a transmitted mark signal of a second frequency during the next following signal interval provided no space signal is being generated during said last mentioned signal interval;

receiver means in the receiver at each station for receiving transmitted mark signals and transmitted space signals of the respective first and second frequencies generated by transmitter at the other station;

said receiver means including a receiver amplifier responsive to both types of transmitted signals;

means at each station for feeding transmitted signals generated at that station to the receiver at that station;

each said amplifier being responsive to received signals of said second frequency having an amplitude above a predetermined threshold for clipping such second-frequency signals and for simultaneously amplifying signals of said first frequency only a small amount compared with the amplification that would occur in the absence of such second-frequency signals above said threshold; and means including a filter in the output of said each amplifier and tuned to one of said frequencies for generating a received train of mark and space signals corresponding in time and duration to the generated mark and space signals.

5. A system of signaling as defined in claim 4 including means in each amplifier responsive to the received train of signals appearing in the output of said each amplifier for producing visual indications corresponding to the respective trains of generated waves.

6. In an apparatus for transmitting and receiving series of coded signals between stations over an interconnecting line under circumstances under which random noise, echoes, or other extraneous signals may also be received from the line, and wherein said coded signals are in the form of sequences of mark signals and space signals;

a combined transmitter and receiver unit for installation at such a station, said unit comprising a transmitter for generating a train of mark signals and space signals in successive signal intervals for application to such line;

means responsive to the initiation of each of said space signals for generating a transmitted space signal of a first frequency during the interval containing said each space signal;

means for generating a transmitted mark signal of a second frequency during the next following signal interval provided no space signal is being generated during said last mentioned signal interval;

said unit also comprising a receiver for receiving from said line transmitted space signals and transmitted mark signals of the respective first and second frequencies;

said receiver including a receiver amplifier responsive to both types of transmitted signals;

means for feeding signals generated by said transmitter directly to said receiver;

means in each said amplifier responsive to received signals of said second frequency having an amplitude above a predetermined threshold for clipping such second-frequency signals and for simultaneously amplifying signals of said first frequency only a small amount compared with the amplification that would occur in the absence of such second-frequency signals above said threshold; and means including a filter in the output of said amplifier and tuned to one of said frequencies for generating a train of mark and space signals corresponding in time and duration to the transmitted mark and space signals.

7. In a system of signaling as defined in claim 6 including means responsive to trains of signals appearing in the output of said amplifier for producing visual indications corresponding to the respective trains of generated waves.

8. Apparatus as defined in claim 6 wherein said frequencies lie in the audio frequency range below 3000 c.p.s. and are anharmonic.

9. In apparatus as defined in claim 6:

a coupler for coupling the transmitter and receiver to a telephone handset having a microphone and an earphone;

said coupler comprising a loudspeaker connected to the transmitter for feeding signals from said transmitter to said microphone, and also comprising a microphone of its own for feeding signals from said earphone into said receiver.

10. Apparatus as defined in claim 9 for use with a telephone handset of the type that includes an anti-side-tone transformer, means coupling the output of said transmitter to the input of said receiver for feeding transmitted mark and space signals from said transmitter directly to said receiver.

11. Apparatus for receiving and reproducing information represented by a series of coded signals transmitted over a line under circumstances under which random noise, echoes, and other extraneous signals may also exist on the line, and wherein said coded signals are in the form of sequences of mark signals and space signals of different frequencies:

said apparatus comprising a receiver for receiving such signals, said receiver including a receiver amplifier responsive to such signals;

limiting means in said amplifier responsive to received signals having one of said frequencies and having an amplitude above a predetermined threshold for clipping such signals of said one frequency and for simultaneously amplifying signals of the other frequency only a small amount compared with the amplification that would occur in the absence of such signals of said one frequency;

a filter in the output of said amplifier, said filter being selectively responsive to signals of said one frequency and adapted to attenuate signals of said other frequency;

a rectifier receiving the signal from said filter whereby a train of rectified output signals are generated, such output signals having high and low levels corresponding respectively to said mark and space signals; and reproducing means responsive to the output of said rectifier for producing indications corresponding to information represented by said transmitted coded signals.

12. Apparatus as defined in claim 11 wherein said reproducing means comprises:

a teletypewriter unit comprising relay means, and a bias voltage source, said output signals acting with said bias voltage source to operate and restore said relay means in accordance with the levels of said output signals to reproduce said information indications.

13. Apparatus as defined in claim 11 wherein said limiting means comprises a semiconductor element having a p-n junction whose resistance decreases to reduce the effective gain of said amplifier when signals exceeding said predetermined threshold are supplied to said receiver.

References Cited

UNITED STATES PATENTS

| | | | |
|---|---|---|---|
| 3,414,827 | 12/1968 | Warburton | 178—88 X |
| 3,172,953 | 3/1965 | Votaw | 178—88 |

KATHLEEN H. CLAFFY, Primary Examiner

W. A. HELVESTINE, Assistant Examiner

U.S. Cl. X.R.

178—88; 179—4; 325—30